United States Patent
Ohsawa et al.

(10) Patent No.: US 7,239,343 B2
(45) Date of Patent: Jul. 3, 2007

(54) IMAGE DISTRIBUTION METHOD EMPLOYING BOTH A FIRST NETWORK WHOSE BANDWIDTH IS NOT ASSURED AND SECOND NETWORK WHOSE BANDWIDTH IS ASSURED FOR CONTROL AND IMAGE TRANSMISSION

(75) Inventors: Hiroyuki Ohsawa, Chiba (JP); Tomoaki Kawai, Kanagawa (JP); Kazuko Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 724 days.

(21) Appl. No.: 10/383,651

(22) Filed: Mar. 10, 2003

(65) Prior Publication Data
US 2003/0184651 A1 Oct. 2, 2003

(30) Foreign Application Priority Data
Mar. 29, 2002 (JP) .............................. 2002-093993

(51) Int. Cl.
*H04N 5/232* (2006.01)
*H04N 5/08* (2006.01)

(52) U.S. Cl. ................................ 348/211.3; 348/211.5; 348/552

(58) Field of Classification Search ............................... 348/211.99–211.14, 552; 725/105
See application file for complete search history.

(56) References Cited

U.S. PATENT DOCUMENTS

| 5,619,247 A | 4/1997 | Russo ........................ 725/104 |
| 5,818,537 A | 10/1998 | Enokida et al. ............. 348/441 |
| 5,825,432 A * | 10/1998 | Yonezawa .................... 348/563 |
| 6,002,995 A | 12/1999 | Suzuki et al. ............... 702/188 |
| 6,067,571 A * | 5/2000 | Igarashi et al. ............. 709/232 |
| 6,157,767 A | 12/2000 | Suzuki .......................... 386/1 |
| 6,414,716 B1 | 7/2002 | Kawai ......................... 348/211 |
| 6,611,285 B1 * | 8/2003 | Morita ....................... 348/211.3 |
| 6,851,113 B2 * | 2/2005 | Hemsath ...................... 718/104 |
| 6,961,082 B2 * | 11/2005 | Miura et al. ............. 348/211.9 |
| 6,965,399 B1 | 11/2005 | Oka et al. ............. 348/211.99 |
| 7,034,864 B2 * | 4/2006 | Tanaka .................. 348/207.11 |
| 2001/0019631 A1 | 9/2001 | Ohsawa et al. ............. 382/242 |
| 2002/0154070 A1 | 10/2002 | Sato et al. ....................... 345/8 |
| 2002/0168959 A1 * | 11/2002 | Noguchi et al. ............ 455/405 |

FOREIGN PATENT DOCUMENTS

| EP | 1 033 850 A2 | 9/2000 |
| JP | 11-055655 | 2/1999 |
| JP | 2000-253180 | 9/2000 |
| JP | 2001-054102 | 2/2001 |
| JP | 2001-285856 | 10/2001 |

* cited by examiner

*Primary Examiner*—Ngoc-Yen Vu
*Assistant Examiner*—Adam L. Henderson
(74) *Attorney, Agent, or Firm*—Fitzpatrick, Cella, Harper & Scinto

(57) ABSTRACT

An image distribution method for distributing an image acquired by a camera on a network includes the steps of receiving control information for the camera from an image reception apparatus via a packet-switched network; and sending an image acquired by the camera to the image reception apparatus via a circuit-switched network.

12 Claims, 11 Drawing Sheets

FIG. 8

Enter your ID and password.

ID :  ▭

Pass : ▭

AUTOMATIC CAMERA-CONTROL DATA

| Operation pattern (1:wait 2:pantiltzoom 3:Preset 4:filterselect···) | Parameter (Data representing value for operation pattern) |
|---|---|
| 1:wait | 30sec |
| 2:pantiltzoom | p:30° t:45° z:30° |
| 1:wait | 10sec |
| 3:preset | Main reception |
| ···· | ···· |
| 5:disconnect | --- |

IMAGE DISTRIBUTION METHOD EMPLOYING BOTH A FIRST NETWORK WHOSE BANDWIDTH IS NOT ASSURED AND SECOND NETWORK WHOSE BANDWIDTH IS ASSURED FOR CONTROL AND IMAGE TRANSMISSION

BACKGROUND OF THE INVENTION

1. Field of the Invention

The present invention relates to an image distribution system that is suitable for use, for example, with a monitoring camera.

2. Description of the Related Art

In a known system for monitoring image acquired by a video camera from a plurality of remote locations, remote control of camera status, such as pan, tilt angle, and zoom factor of the camera, is allowed in addition to observing image acquired by the camera. For example, in a system product available, using packet-switched communications, a camera that can be controlled by a computer is connected to a WWW (World Wide Web) server on the Internet so that a person that has accessed is allowed to receive real-time image acquired by the camera and also to control the camera.

Many mobile apparatuses such as cellular phones have the capability of accessing the Internet using packet-switched communications to allow browsing WWW and exchanging electronic mails, in addition to the capability of circuit-switched communications, in which an end-to-end connection is maintained throughout a call.

Generally, circuit-switched communications are suitable for continuously transmitting a large amount of a particular type of data since the bandwidth is assured. For example, circuit-switched communications are used for a system that requires an assured bandwidth for particular data (e.g., video data), such as a videophone system. However, circuit-switched communications are not suitable for specifically controlling a camera on the other end.

Furthermore, when a continuous image such as a moving image is to be transferred, packet-switched communications are not suitable since the bandwidth is not assured.

SUMMARY OF THE INVENTION

Accordingly, it is an object of the present invention to provide a system that allows a camera to be specifically controlled while receiving a moving image of a relatively high quality and high frame rate by a communication terminal with a limited rate of data communication, such as a cellular phone.

In order to achieve the above object, the present invention, in one aspect thereof, provides an image distribution method of a distribution apparatus for distributing an image acquired by a camera on a network, including the steps of receiving control information to control the camera from an image reception apparatus via a packet-switched network; and sending an image acquired by the controlled camera to the image reception apparatus via a circuit-switched network.

The present invention, in another aspect thereof, provides a storage medium storing a program for executing a process of distributing an image acquired by a camera on a network, the program including the steps of receiving control information to control the camera from an image reception apparatus via a packet-switched network; and sending an image acquired by the controlled camera to the image reception apparatus via a circuit-switched network.

The present invention, in yet another aspect thereof, provides a control server for controlling a camera, including a receiving device for receiving control information for the camera from an image reception apparatus via a packet-switched network; and a sending device for sending an image acquired by the camera via a circuit-switched network.

Further objects, features and advantages of the present invention will become apparent from the following description of the preferred embodiments (with reference to the attached drawings).

BRIEF DESCRIPTION OF THE DRAWINGS

FIG. 8 is an illustration of an example screen on the display of the cellular phone.

DESCRIPTION OF THE PREFERRED EMBODIMENTS

Preferred embodiments of the present invention will now be described with reference to the accompanying drawings.

First Embodiment

In a first embodiment of the present invention, a procedure of operating a camera is determined and sent via a packet-switched network using a cellular phone, and an image is received after switching to a circuit-switched network.

Figure 1:
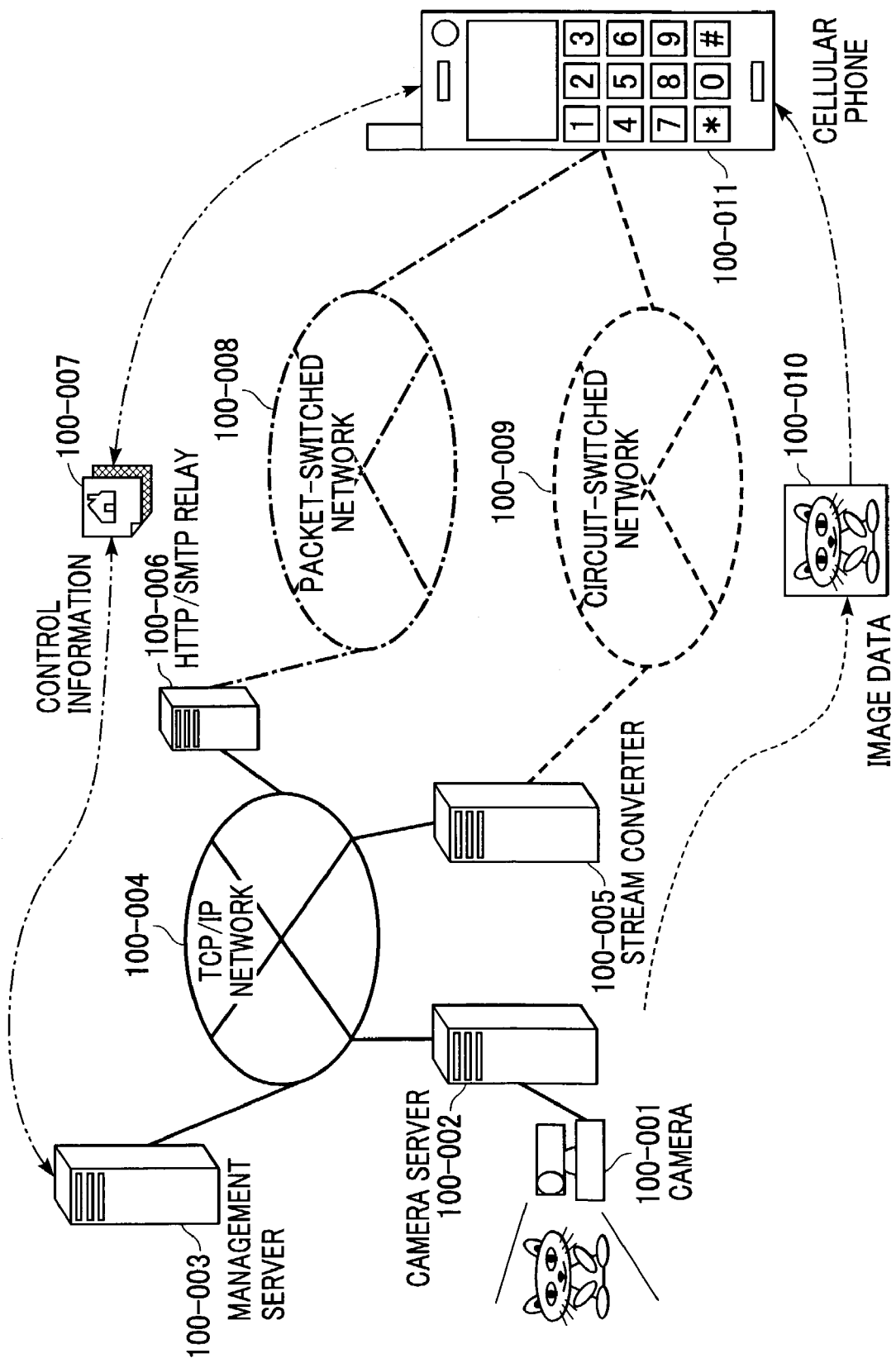
FIG. 1 is a configuration diagram of an image distribution system.

FIG. 1 is a diagram showing the overall configuration of an image distribution system according to the first embodiment. Referring to FIG. 1, the system according to the first embodiment uses communication networks including a TCP/IP network 100-004, which is used as a standard protocol of the Internet, a packet-switched network 100-008 in which data is segmented into packets (data segments) of a certain size, each of the packets transmitted on a communication medium containing a destination address, properties of data, and an error checking code, etc., and a circuit-switched network 100-009, in which the rate of data communication is limited up to, for example, 64 kbps and connection is maintained throughout a communication session.

The TCP/IP network 100-004 may be replaced with a computer network with a similar function, such as Apple-Talk (trademark), NetBios, or IPX/SPX.

The packet-switched network 100-008 is a network dedicated for communications by cellular phones 100-011, and is different from the TCP/IP network 100-004. Packet data on the packet-switched network 100-008 is converted into a format compatible with the TCP/IP network 100-004 by an HTTP/SMTP relay 100-006.

The TCP/IP network 100-004 also assumes packet switching, and the packet-switched network 100-008 can be logically considered as the same network as the TCP/IP network 100-004. That is, if a logical connection exists, the TCP/IP network 100-004 and the packet-switched network 100-008 may be considered as a single packet-switched network or computer network without distinction between.

A management server 100-003 executes a Web server process and an automatic camera-control process. The Web server process monitors accesses by terminals, termination of the accesses, etc. The automatic camera-control process, in cooperation with the Web server process, provides a GUI for controlling a camera by the cellular phone 100-011, controls timing of sending and receiving an image, and so forth.

A camera server 100-002 executes an image obtaining and sending process and a camera control process. The image obtaining and sending process obtains an image acquired by a camera 100-001 connected to the camera server 100-002, compresses the image data, and sends the compressed image data to a client (the cellular phone 100-011) requesting the image. The compression may be based, for example, on Motion-JPEG.

The camera control process accepts a request from the cellular phone 100-011 for controlling the camera 100-001 (e.g., pan, tilt, zoom, focus, or aperture), and controls the camera so that the camera will be controlled accordingly. Furthermore, in this embodiment, the camera control process assigns a right for controlling the camera 100-001 (hereinafter referred to as a control right) for a predetermined period to only one of a plurality of clients wishing to control the camera 100-001. By assigning the control right sequentially to the client terminals (including the cellular phone 100-011) wishing to control the camera 100-011 at a cycle of the predetermined period, each of the client terminals is allowed to operate the camera exclusively for the predetermined period. Thus, if a client terminal (e.g., the cellular phone 100-011) viewing a camera image wishes to control direction, zoom, etc. of the camera 100-001, control of the camera is allowed for the predetermined period only after acquiring the control right by the camera control process (irrespective of whether the control right is acquired explicitly via a GUI on the cellular phone 100-011).

A stream converter 100-005 executes a stream conversion process. The stream conversion process converts image data from the image obtaining and sending process to data in a format for transmission to the cellular phone 100-011 via the circuit-switched network 100-009. In this embodiment, since the image obtaining and sending process of the camera server 100-002 creates and sends moving image information in the Motion-JPEG format, the stream conversion process converts the format from Motion-JPEG into, for example, MPEG-4. Since formats of image data that can be handled (e.g., MPEG-1, MPEG-2, MPEG-4, DivX, RealVideo) differ among mobile apparatuses, such as the cellular phone 100-011, this conversion of converting image data in the Motion-JPEG format into formats compatible with the respective apparatuses is very effective.

Furthermore, the stream conversion process allows conversion of image size, image resolution, the number of colors, etc., in addition to conversion of format described above.

Furthermore, the stream converter 100-005 is connected to the circuit-switched network 100-009, and has the functions of calling and disconnecting by circuit switching. These functions are similar to those of a usual modem.

Figure 3:
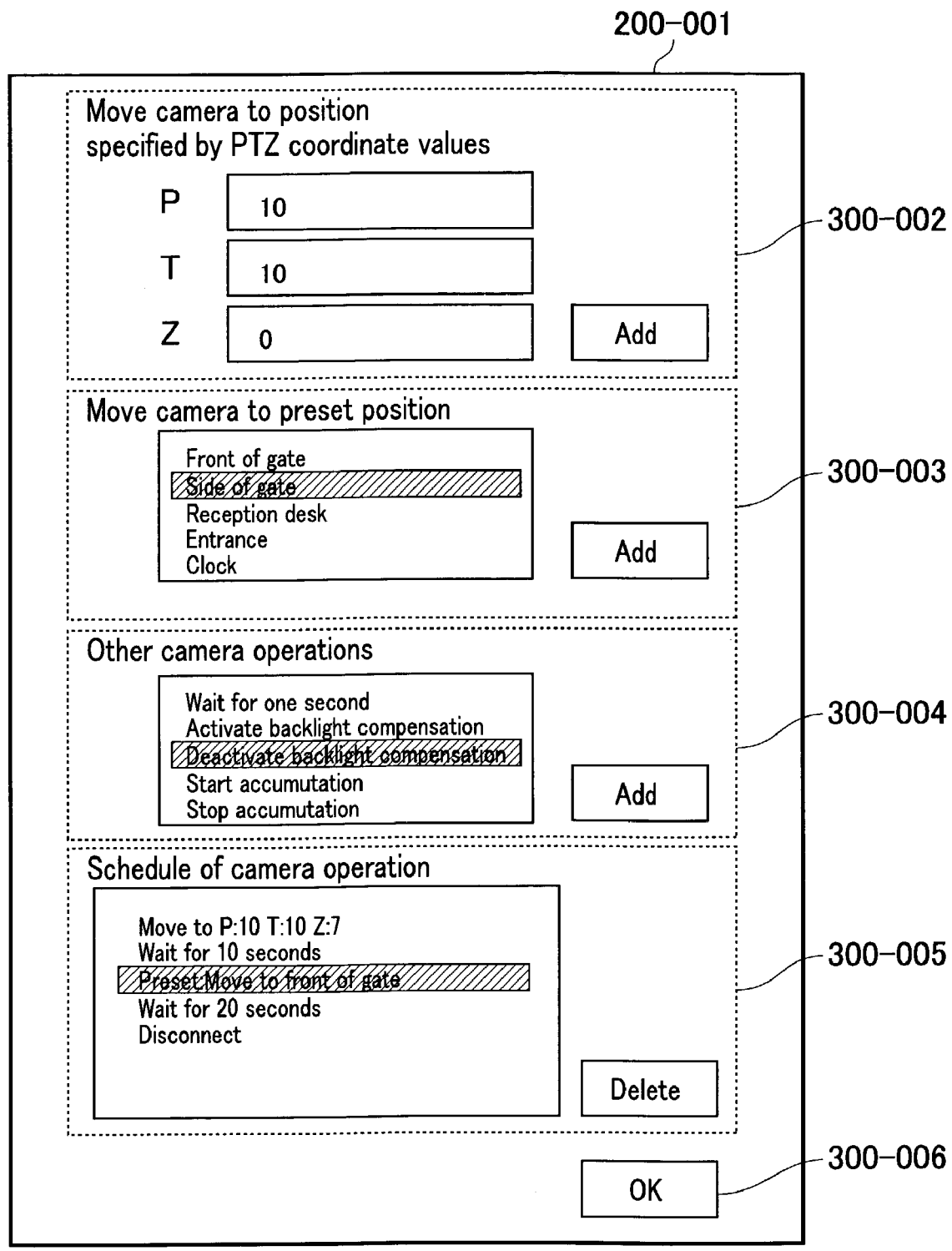
FIG. 3 is an illustration of an example screen on the display of the cellular phone.

Automatic camera-control data 100-007 input via a GUI shown in FIG. 3 at the cellular phone 100-011 is transmitted via an HTTP/SMTP process to the automatic camera-control process working in cooperation with the Web server process.

Furthermore, the stream conversion process uses the automatic camera-control process of the management server 100-003 to interpret the automatic camera-control data 100-007, and the camera control process is notified or instructed of a camera control operation based on the interpretation. Furthermore, the image obtaining and sending process is instructed to send moving image data 100-010 to the cellular phone 100-011 via the stream conversion process over the circuit-switched network 100-009. The automatic camera-control data will be described in detail later with reference to FIG. 9.

Figure 2C:
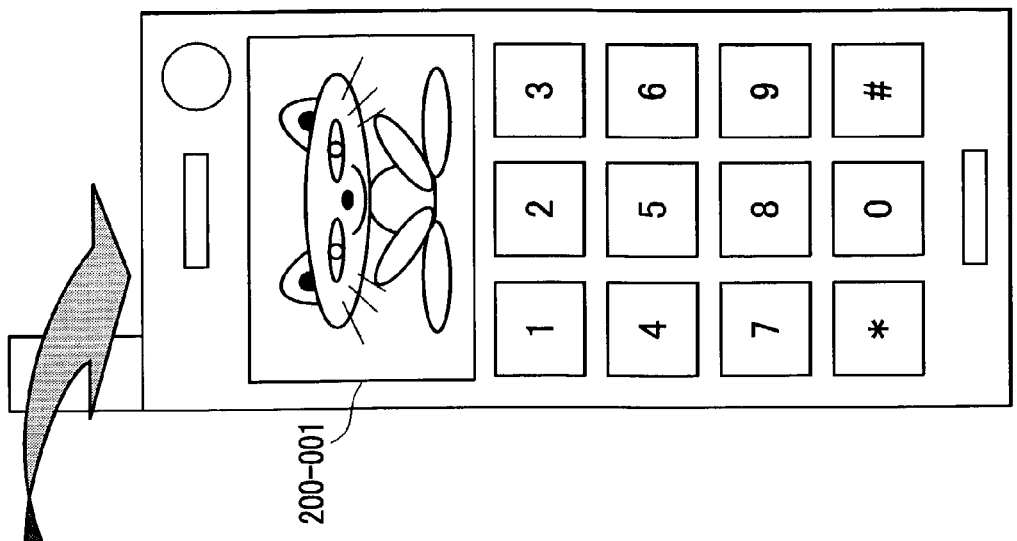
FIG. 2 is an illustration showing transition of screen on a display of a cellular phone.
Figure 2B:
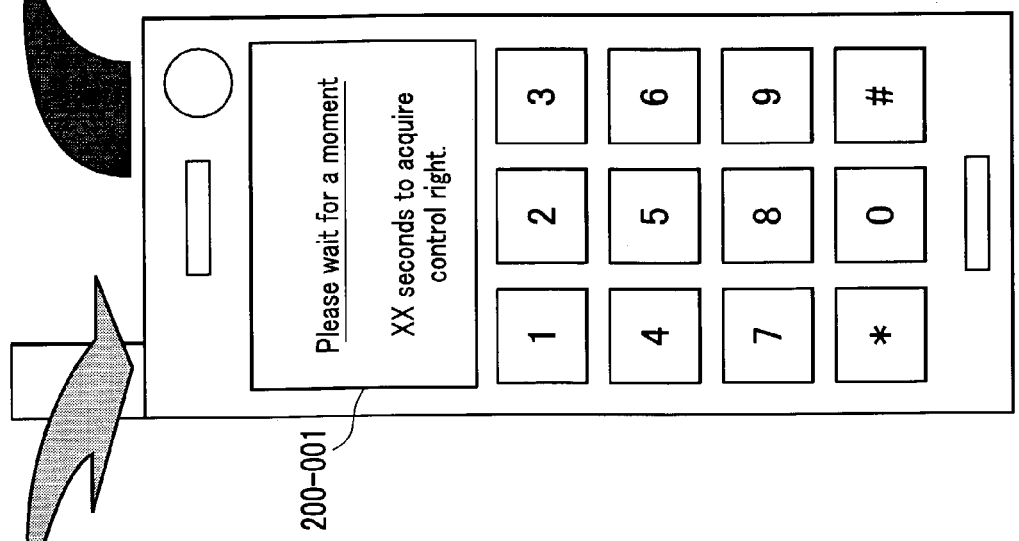
Figure 2A:
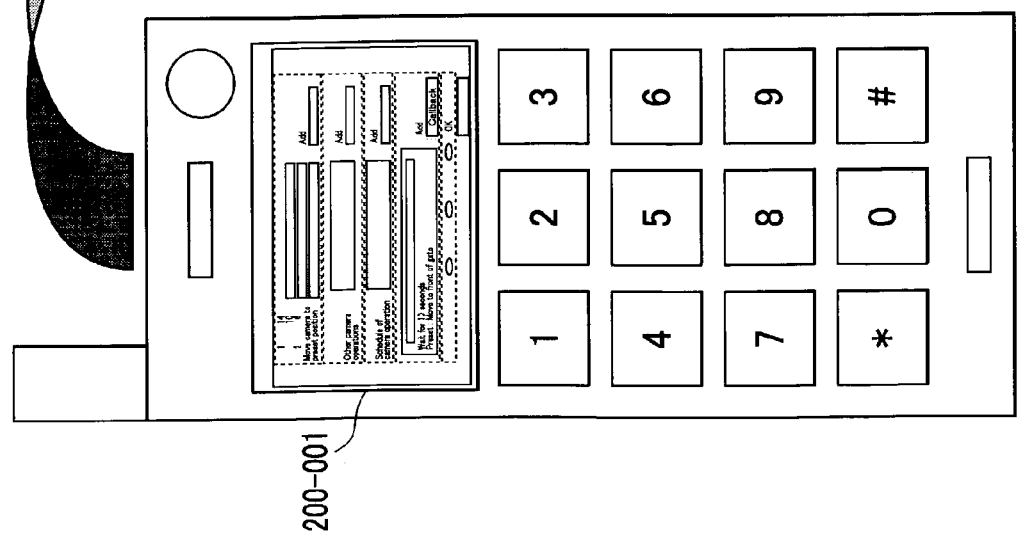

FIG. 2 shows transition of GUI displayed on the cellular phone 100-011. A display 200-001 changes display status in accordance with communication status of the cellular phone 100-011, as will be described below.

Part (a) of FIG. 2 shows display status during a packet-switched communication, in which a GUI for accepting input of a direction or the like for controlling the camera 100-001 as desired by a user of the cellular phone 100-011 is displayed on the display 200-001. The user is allowed to input a command for controlling the camera 100-001, such as operation relating to pan, tilt, or zoom, selection of a preset item, thereby changing a camera direction or the like for viewing a live image (GUI will be described later in detail).

Figure 9:
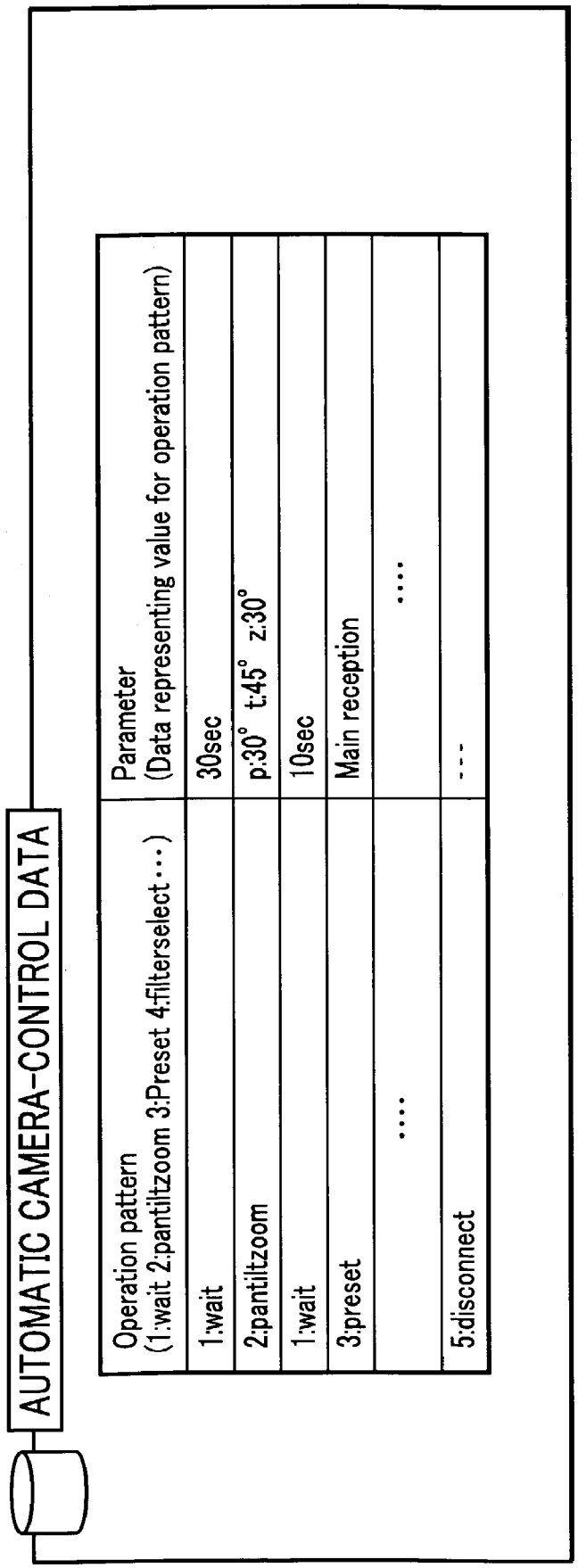
FIG. 9 is a diagram showing an example of automatic camera control data.

When the user completes input of automatic camera-control data, and selects an OK button, automatic camera-control data as shown in FIG. 9 is transmitted to the management server 100-003 via the packet-switched network 100-008 and the HTTP/SMTP relay 100-006, and the automatic camera-control data is processed by the automatic camera-control process.

In response to the automatic camera-control data received from the cellular phone 100-011, the automatic camera-control process sends HTML data for switching to a circuit-switched connection, including information regarding a destination of connection with the stream converter 100-005 via the circuit-switched network 100-009, to the cellular phone 100-011 via the HTTP/SMTP relay 100-006 and the packet-switched network 100-008. Part (b) of FIG. 2 shows a screen displayed on the display 200-001 at this time.

Figure 4:
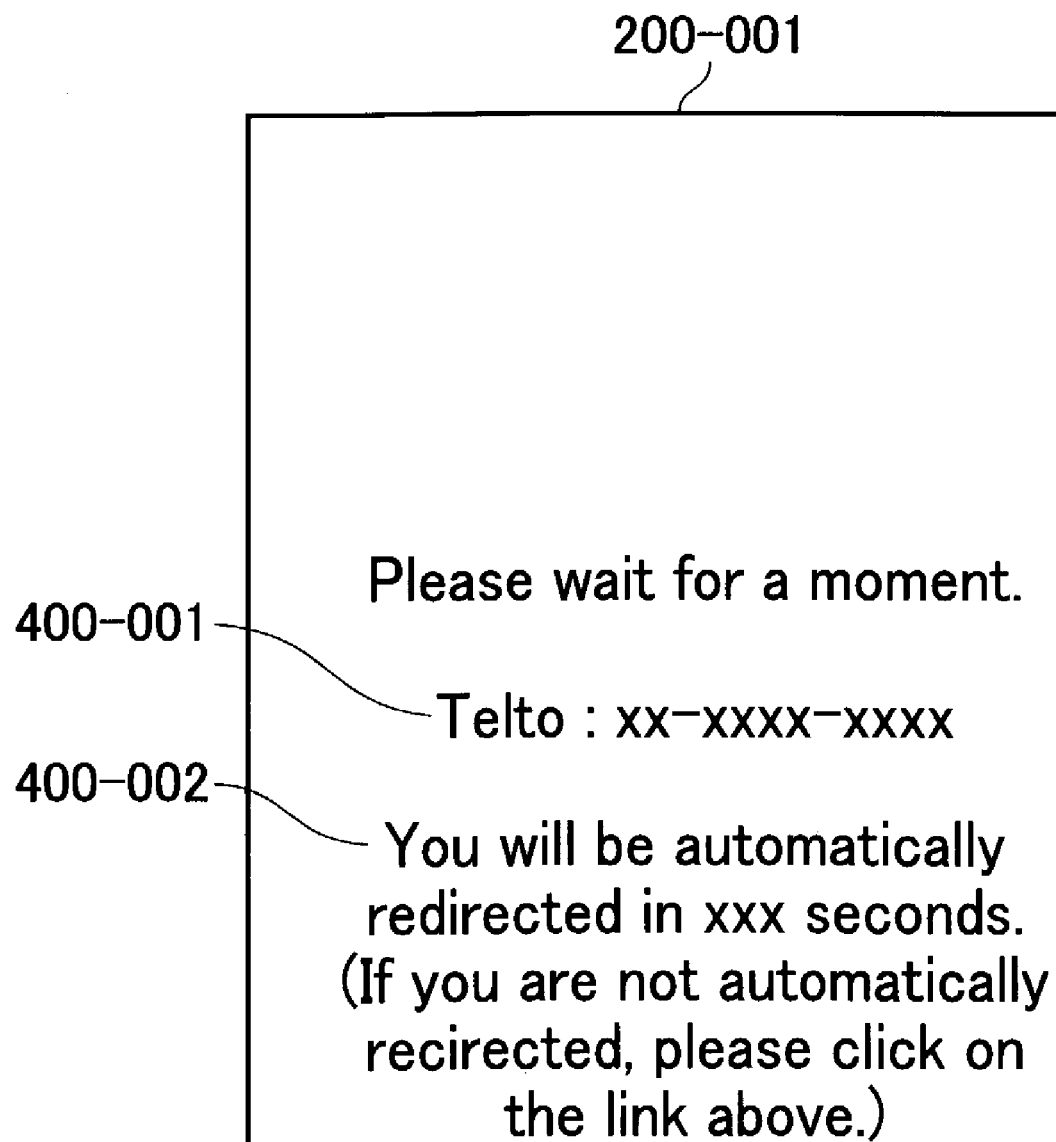
FIG. 4 is an illustration of an example screen on the display of the cellular phone.

FIG. 4 shows the screen displayed based on the HTML data in further detail, in which information 400-001 relating to a link indicating a destination of a connection via the circuit-switched network 100-009 is embedded.

The link function is a standard function in HTML data. In this embodiment, the link function is implemented by using a <telto> tag in the HTML data for a connection via the circuit-switched network 100-009. Other methods that allow a link to be formed may be used instead of the <telto> tag in the HTML data. Furthermore, the HTML data allows a script (such as Java script or VB script), i.e., a small automatically executable program, to be embedded therein. This allows switching of connection from a packet-switched network to a circuit-switched network after elapse of a predetermined time. Thus, in addition to allowing switching to a circuit-switched network by a user explicitly selecting the link information 400-001, it is also possible to automatically switch from a packet-switched network to a circuit-switched network.

Time information 400-002 indicates a time to acquisition of the control right of the camera. This information is provided since it is possible that a large number of users has accessed, wishing to operate the camera. The automatic camera-control process, when sending HTML data including the link information, issues a query to the camera control process, obtaining and displaying information as to how long it will take to acquire the control right of the camera 100-001.

When the cellular phone 100-011 is waiting for a connection with the stream converter 100-005 via the circuit-switched network 100-009, a ringing tone for calling a destination is output from the cellular phone 100-011. Alternatively, a sound or speech indicating a wait status, different from the ringing tone, may be output. Furthermore, instead of the screen shown in FIG. 4, an image or animation indicating a wait status may be displayed.

When a connection has been formed automatically or manually with the stream converter 100-005 via the circuit-switched network 100-009 as described above, moving image data is distributed to the cellular phone 100-011 via the circuit-switched network 100-009. Part (c) of FIG. 2 shows a screen displayed when the image data is distributed. When distribution of a moving image to the cellular phone 100-011 has started, the stream converter 100-005 notifies the management server 100-003 that a connection has been established. Then, the automatic camera-control process extracts camera control information in the automatic camera-control data in time order, and sends the camera control information to the camera server 100-002. The camera control process executes processing according to the automatic camera-control data received, allowing the camera to be controlled as desired by the user, for example, changing pan, tilt, and zoom of the camera 100-001. By operating buttons of the cellular phone 100-011 as described above, the user is allowed to control the camera as desired while viewing a live moving image using the system according to this embodiment.

FIG. 3 shows a GUI for automatic control of the camera, displayed on the display 200-001 as shown in part (a) of FIG. 2 while the cellular phone 100-011 is under a packet-switched communication.

The GUI allows the user to specify a desired operation of the camera 100-001 using buttons of the cellular phone 100-011. Although it is assumed in this embodiment that data for the GUI is written in HTML, the GUI may be written in other GUI description languages with similar functions. Alternatively, input may be allowed by transferring a Java applet or the like to the cellular phone 100-011.

A GUI 300-002 is a GUI for specifying camera control parameters based on absolute coordinate values. The camera can be moved to any coordinate position the camera is allowed to move to by specifying a pan angle, a tilt angle, and a zoom angle on the GUI 300-002.

A GUI 300-003 is a GUI for specifying camera control parameters for preset operations. The user selects from a list of preset names or locations for viewing an image at a predetermined angle (e.g., front of the gate, reception desk, etc.), allowing the camera to be directed in a specified direction. The camera control process stores a table of preset names and PTZ values associated therewith. When a camera control request specifying a preset name is received, the camera control process controls the camera in accordance with PTZ values obtained with reference to the table. The list of preset names is obtained in advance as HTML data from the automatic camera-control process, and is reflected on the GUI 300-003.

Furthermore, sequential switching among a plurality of cameras can be similarly handled as an extension of preset operations. In that case, using preset camera coordinate positions are managed as sets of (pan, tilt, zoom, camera number)=(P, T, Z, C) instead of (pan, tilt, zoom)=(P, T, Z).

A GUI 300-004 is a GUI for specifying additional camera control parameters other than pan, tilt, and zoom. This GUI allows selection and setting of various camera control operations such as filter setting and backlight compensation.

A GUI 300-005 shows parameters that have been entered in time order. The GUI 300-005 shows camera control parameters input on the GUIs 300-002 to 300-004 in order of input from the top, and it allows editing, such as deleting, of the parameters.

When a GUI 300-006 is selected, a schedule of the camera control parameters that have been set as described above is sent to the management server 100-003 as automatic camera-control data. The automatic camera-control process outputs an instruction for controlling the camera sequentially from the start of the camera control data to the camera server 100-002, allowing the camera 100-001 to operate as desired by the user.

FIG. 4 shows a screen that is displayed on the display 200-001 when the OK button 300-006 shown in FIG. 3 is selected. The screen shown in FIG. 4 has been described earlier.

When the cellular phone 100-011 is capable of automatically switching to a destination of a link, it is possible to automatically connect to a destination of a link over the circuit-switched network 100-009 after an elapse of a predetermined time. If the cellular phone 100-011 is not capable of automatically switching to a destination of a link, a time required until a connection to a link destination is formed can be determined from past connection information.

The automatic camera-control process of the management server 100-003 stores an average time taken from when information for a connection with the cellular phone 100-011 via the circuit-switched network 100-009 is sent until when the cellular phone 100-011 forms a connection with the stream converter 100-005. The automatic camera-control process sends longer one of the average time and a time until acquisition of the control right, obtained from the camera control process, as wait time information to the cellular phone 100-011 via the packet-switched network 100-008.

FIG. 9 shows a data table relating to automatic camera-control data that is sent from the cellular phone 100-011 to the management server 100-003 and the stream converter 100-005 via the packet-switched network 100-008.

The data table shown in FIG. 9 includes camera control commands in the time order, and camera control information representing commands for executing stream conversion. The data table stores sets of operation pattern and parameters relating to the operation pattern, and the data has a length corresponding to an amount of camera control operations desired by the user. The camera control information includes, for example, control commands relating to pan, tilt, and zoom of the camera platform, selection of filter, selection of preset item (a plurality of cameras), wait with no operation, and disconnection of a circuit-switched connection. The automatic camera-control process of the management server 100-003 refers to the data table for automatic camera control, shown in FIG. 9, to request control of the camera (e.g., pan, tilt, zoom, filter selection) and connection and disconnection of a connection to the camera control process of the camera server 100-002, allowing the camera to operate as desired by the user.

Figure 5:
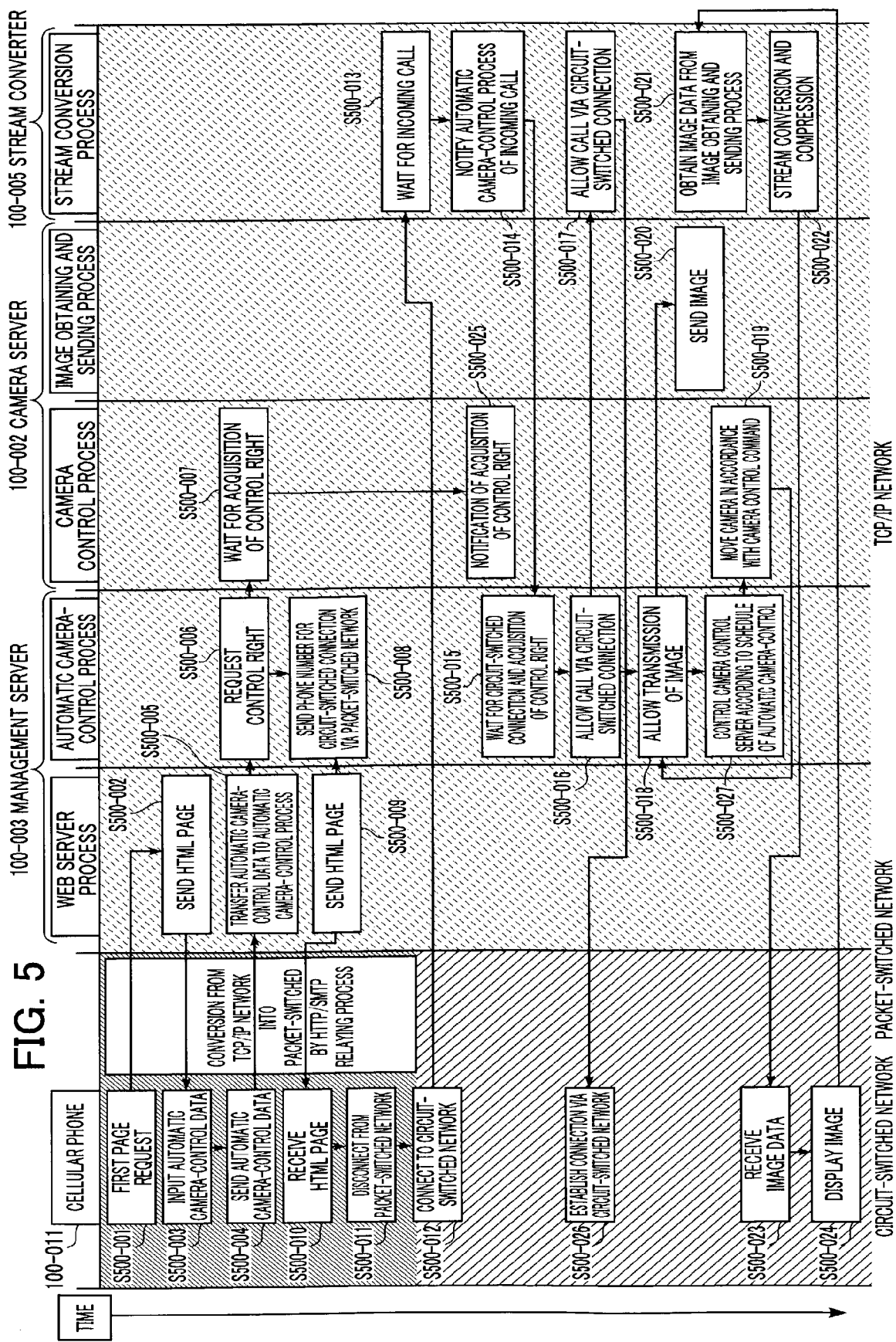
FIG. 5 is a sequence diagram of an image distribution system according to a first embodiment of the present invention.

FIG. 5 is a sequence diagram of the image distribution system according to this embodiment. The sequence shown in FIG. 5 relates to a flow of processing including connection of the cellular phone 100-011 to the management server 100-003, setting and sending of automatic camera-control data, switching from the packet-switched network 100-008 to the circuit-switched network 100-009, and reception of a moving image and controlling of the camera.

First, in step S500-001, the cellular phone 100-011 requests HTML data or the like of a page to be displayed first to the management server 100-003 (i.e., accesses the management server 100-003). In response to the request, the Web server process of the management server 100-003 sends HTML data to the cellular phone 100-011 in step S500-002. The cellular phone 100-011 displays a GUI shown in FIG. 3 based on the data.

The HTML data for the GUI shown in FIG. 3 may be generated dynamically, or static HTML data may be prepared and used. In the former case, HTML data for the GUI is automatically generated by the automatic camera-control process working in cooperation with the Web server process. The GUI data thus generated is sent by the Web server process.

Then, in step S500-003, the user generates automatic camera-control data using the GUI shown in FIG. 3, as described earlier. In step S500-004, the user sends the automatic camera-control data to the management server 100-003 via the packet-switched network 100-008, thereby requesting an image acquired by the camera 100-001 and also requesting acquisition of the control right of the camera 100-001. Then, in step S500-005, the Web server process receives the automatic camera-control data, and transfers the automatic camera-control data to the automatic camera-control process for processing.

In step S500-006, the automatic camera-control process requests acquisition of the control right of the camera to the camera control process of the camera server 100-002. The automatic camera-control process is notified, by a reply from the camera server 100-002, of a time until controlling of the camera is allowed.

Then, in step S500-008, based on the information including the time until controlling of the camera is allowed and phone number information for a call by the stream converter 100-005 via the circuit-switched network 100-009, registered in the management server 100-003, HTML data for a GUI for switching connection to the circuit-switched network 100-009, shown in FIG. 4, is generated, which is transferred to the Web server process. The Web server process sends the HTML data to the cellular phone 100-011 via the packet-switched network 100-008.

In step S500-010, the GUI shown in FIG. 4 is displayed based on the HTML data received. Then, in step S500-011, if connection can be automatically switched, the cellular phone 100-011 quits packet communication via the packet-switched network 100-008. Then, in step S500-012, a connection with the stream converter 100-005 is formed via the circuit-switched network 100-009 based on information regarding a phone number for a circuit-switched connection, included in the HTML page.

If the cellular phone 100-011 is not capable of automatically switching connection, the user is allowed to manually switch connection from the packet-switched network 100-008 to the stream converter 100-005.

Communications over the packet-switched network 100-008 may be based on, for example, SMTP instead of HTTP. Although SMTP is a protocol mainly for transferring electronic mails, SMTP also allows data such as HTML pages to be sent, and thus may be used as an alternative to HTTP.

In step S500-013, the stream converter 100-005 receives a request for switching connection to the circuit-switched network 100-009 from the cellular phone 100-011. At this time, the request for switching connection is detected but a connection is not actually established. Then in step S500-014, when the request for connection via the circuit-switched network 100-009 is detected, the stream conversion process notifies the automatic camera-control process of the management server 100-003 of incoming call status of the cellular phone 100-011.

In step S500-015, the automatic camera-control process waits for acquisition of the control right of the camera 100-001 and an incoming call via the circuit-switched network 100-009. When these two conditions are satisfied, sending of a live image and an automatic camera-control operation associated therewith are synchronized with each other.

In step S500-016, in order to reduce communication cost, only when both the notification of an incoming call to the cellular phone 100-011 and the notification of acquisition of the control right of the camera are received from the stream converter 100-005, the automatic camera-control process permits connection for a call by the cellular phone 100-011 via the circuit-switched network 100-009 to the stream converter 100-005. When the permission information is received, the stream converter 100-005 establishes a connection with the cellular phone 100-011 via the circuit-switched network 100-009 in step S500-017. Then, in step S500-026, the cellular phone 100-011 recognizes the connection via the circuit-switched network 100-009. In step S500-023, the cellular phone 100-011 receives a moving image output from the stream converter 100-005, and displays the image in step S500-024. The cellular phone 100-011 maintains display of the moving image unless disconnected from the stream converter 100-005 by the user.

In step S500-018, the automatic camera-control process notifies the image obtaining and sending process of the camera server 100-002 of permission of transmission of an image after a connection between the stream converter 100-005 and the cellular phone 100-011 via the circuit-switched network 100-009 is established. Then, in step S500-020, the image obtaining and sending process compresses data of an image acquired by a camera in connection, and sends the compressed data to the stream converter 100-005. Then, in step S500-021, the stream converter 100-005 receives the image data transmitted from the image obtaining and sending process. In step S500-022, the stream converter 100-005 converts the image data into a format compatible with the cellular phone 100-011, and sends the resulting data to the cellular phone 100-011.

The stream converter 100-005 may selectively convert moving image information acquired by a plurality of cameras. In addition to sending a moving image acquired by the camera 100-001 as described above, the camera control process of the camera server 100-002 controls the camera.

In step S500-027, the automatic camera-control process of the management server 100-003 sends a camera control command to the camera control process of the camera server 100-002 based on an automatic camera-control schedule. Then, in step S500-019, the camera control process receives a camera control command, and controls the camera according to the command received. By executing the series of camera controlling operations and the moving image sending operation in parallel, a live image of an angle specified by the user is displayed on the cellular phone 100-011.

As described above, according to this embodiment, a moving image is obtained via a circuit-switched network after obtaining HTML data in advance via a packet-switched network, so that a period of occupation of the packet-switched network is short. By selectively using the circuit-switched network and the packet-switched network, a camera can be controlled specifically as set by a user while continuously sending and receiving a live moving image acquired by the camera.

Second Embodiment

In a second embodiment of the present invention, the cellular phone 100-011 simultaneously connects to the circuit-switched network 100-009 and the packet-switched network 100-008. That is, in the second embodiment, a user is allowed to input a command for operating a camera while displaying a moving image on the cellular phone 100-011. In this embodiment, the screen on the display 200-001 of the cellular phone 100-011 switches from display of a moving image shown in part (c) of FIG. 2 to a screen for setting of camera operation shown in part (a) of FIG. 2 when the user wishes to operate the camera 100-001.

Figure 6:
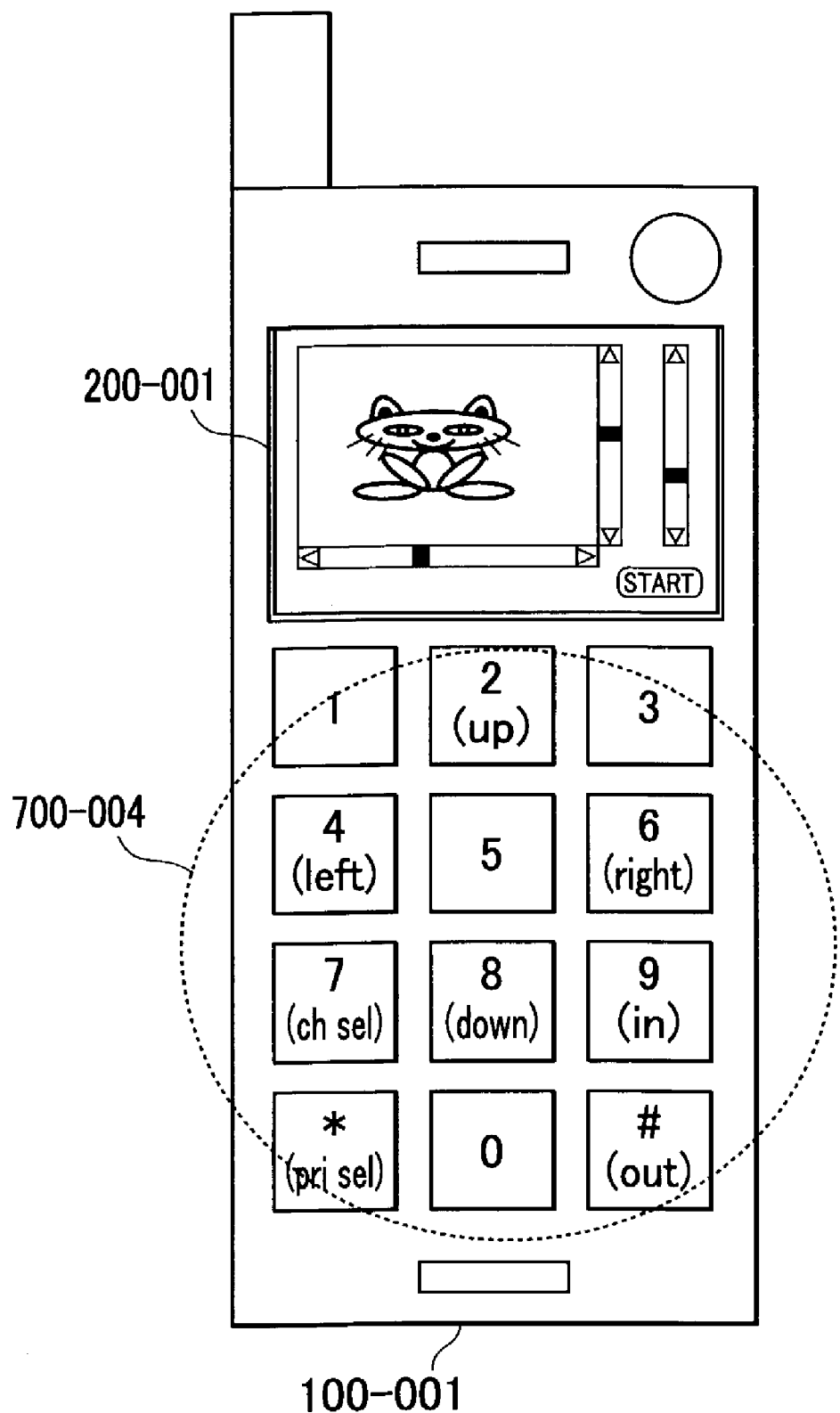
FIG. 6 is an illustration of an example screen on the display of the cellular phone.

FIG. 6 shows another example of display on the display 200-001 of the cellular phone 100-011 in the second embodiment. A GUI 700-001 is a GUI in which an image obtained via the circuit-switched network 100-009 is combined with a GUI for packet communication.

Referring to FIG. 6, the display 200-001 shows a GUI for performing an operation relating to pan, tilt, or zoom, superposed on a moving image received via the circuit-switched network 100-009. At this time, an operation button 700-004, which is usually used for allowing a user to input a phone number, etc., is used as an input button for operating a camera. The operation button 700-004 is an example of a physical button assigned to a camera operation using a GUI description language for the packet-switched network 100-008.

Alternatively, the arrangement may be such that the camera is controlled by recognizing speech of the user.

Figure 7:
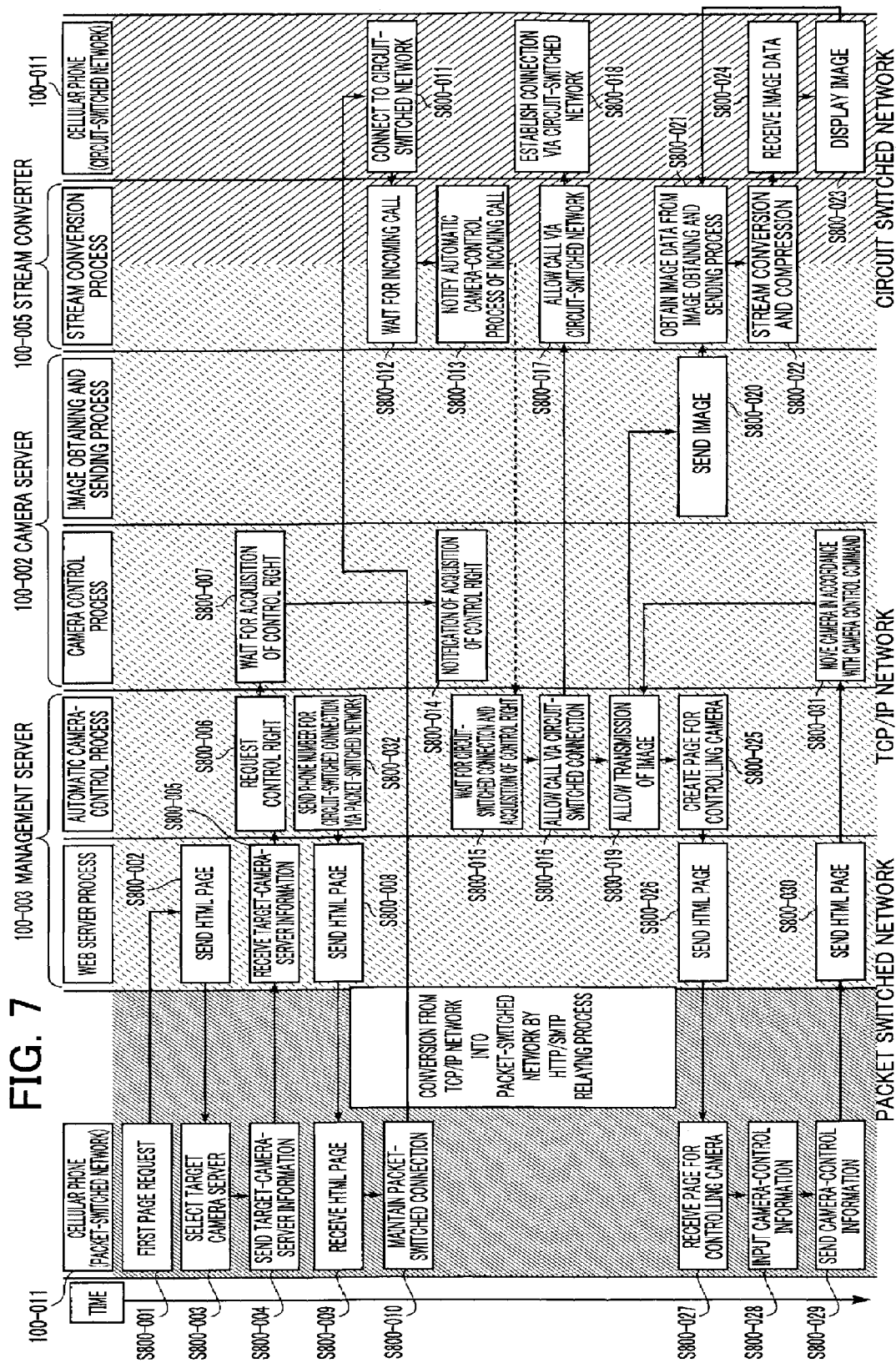
FIG. 7 is a sequence diagram of an image distribution system according to a second embodiment of the present invention.

FIG. 7 shows a sequence of operation in the system according to this embodiment, in which the circuit-switched network 100-009 and the packet-switched network 100-008 are used simultaneously. More specifically, FIG. 7 shows a sequence of operating a camera via the packet-switched network 100-008 while obtaining a moving image via the circuit-switched network 100-009 in this embodiment.

Referring to FIG. 7, in step S800-001, the cellular phone 100-011 issues a request to the management server 100-003 (i.e., accesses the management server 100-003) for HTML data of a page to be displayed first. In response to the request, in step S800-002, the Web server process of the management server 100-003 sends HTML data for displaying a GUI on the cellular phone 100-011. The data of the GUI need not necessarily be in HTML, and any format that similarly allows display of a GUI may be used.

In step S800-003, the HTML data is received, and a GUI is displayed on the cellular phone 100-011 based on the HTML data. The cellular phone 100-011 then waits until a camera server 100-002 is selected by the user.

In step S800-004, the cellular phone 100-011 sends connection target information of the camera server 100-002 selected by the user (although the single camera server 100-002 is shown in FIG. 1, actually, a plurality of camera servers is provided on the network) to the management server 100-003 via the circuit-switched network 100-009.

In step S800-005, the management server 100-003 receives the connection target information. In step S800-006, based on the connection target information received, the management server 100-003 issues a request for a control right of a camera to a camera control process of the camera server 100-002 selected by the user. In step S800-007, the camera control process waits until the control right is released by another user, and then acquires the control right of the camera.

Furthermore, in step S800-032, the automatic camera-control process generates an HTML page including connection target information associated with the circuit-switched network 100-009. In step S800-008, the Web server process sends the HTML data to the cellular phone 100-011. Then, in step S800-009, the cellular phone 100-011 displays a screen shown in part (b) of FIG. 2 on the display 200-001 based on the HTML data received.

Then, a connection is formed with the stream converter 100-005 in step S800-011 via the circuit-switched network 100-009 while maintaining the connection via the packet-switched network 100-008 in step S800-010.

In step S800-012, the stream converter 100-005 recognizes the connection with the cellular phone 100-011. In step S800-013, the stream converter 100-005 notifies the automatic camera-control process of the management server 100-003 of that a call is received. The automatic camera-control process permits connection with the stream converter 100-005 in step S800-016 when the notification of a received call in step S800-013 and the notification of acquisition of the control right of the camera in step S800-014 are both received. Then, the stream converter 100-005 establishes connection with the cellular phone 100-011 in steps S800-017 and S800-018.

Furthermore, in step S800-019, the automatic camera-control process permits the image obtaining and sending process to send an image. In step S800-020, the image obtaining and sending process obtains an image from the camera in connection, compresses the image data, and sends the compressed image data to the stream converter 100-005.

Then, in step S800-021, the stream conversion process of the stream converter 100-005 receives the image data processed by the image obtaining and sending process, converts the image data into an image format compatible with the cellular phone 100-011, and sends the converted image to the cellular phone 100-011 in step S800-022. In step S800-024, the cellular phone 100-011 receives the moving image transmitted from the stream converter 100-005, and displays the moving image in step S800-023.

In this manner, the cellular phone 100-011 receives a moving image. This operation of receiving a moving image is continued unless the user performs an operation to request disconnection.

The camera is controlled in parallel with the above-described operation of receiving an image.

In step S800-025, the automatic camera-control process of the management server 100-003 generates HTML data for controlling the camera. In step S800-026, the Web server process sends the HTML data to the cellular phone 100-011. In step S800-027, the cellular phone 100-011 receives the HTML data for controlling the camera, and displays a GUI for controlling the camera on the display 200-001 based on the HTML data.

In step S800-028, the user enters camera control information on the GUI in display, which is transmitted to the management server 100-003 in step S800-029. For example, the camera control information may be camera control data input by the user on the screen shown in FIG. 6, displayed on the display 200-001, or time-series data for controlling the camera, input by operations on the screen shown in FIG. 3. The camera control information includes camera control commands that are to be interpreted by the camera control process, and the camera control commands are transferred directly to the camera control process through the Web server process of the management server 100-003. In step S800-031, the camera control process controls the camera based on the camera control commands.

In this embodiment, as described above, a process for controlling a camera and a process for sending and receiving an image are executed simultaneously while maintaining a packet-switched connection and a circuit-switched connection. Accordingly, as compared with the first embodiment, the camera can be controlled in real time, and a moving image of a high quality can be transmitted.

Third Embodiment

A third embodiment of the present invention is an example of improvement of the first and second embodiments. The third embodiment uses a different method with respect to timing of connection of a cellular phone via a circuit-switched network.

As opposed to the first and second embodiment, in which a connection via the circuit-switched network 100-009 is formed after the user of the cellular phone 100-011 has acquired a control right of a camera, in the third embodiment, a circuit-switched connection is formed without waiting for acquisition of a control right of a camera.

The sequence of operation is basically the same in the third embodiment, except in that a connection is formed with the cellular phone 100-011 immediately without a time lag for waiting by the automatic camera-control process, so that a moving image is displayed on the cellular phone 100-011 immediately after a circuit-switched connection is formed with the cellular phone 100-011.

Although the timing when display of an image starts is not synchronized with the timing when operation of the camera becomes possible, it is an advantage that a moving image is displayed even before operation of the camera is allowed.

Any of the first, second, and third embodiments may be selected in accordance with a policy of a person in charge of the system.

Fourth Embodiment

A fourth embodiment of the present invention is a modification of the third embodiment. In the fourth embodiment, a connection via the circuit-switched network 100-009 is formed not by the cellular phone 100-011 calling the stream converter 100-005, but by the stream converter 100-005 calling the cellular phone 100-011, i.e., by using a callback.

In this embodiment, with regard to timing of callback, the stream converter 100-005 calls the cellular phone 100-011 when a control right of a camera has been acquired, so that a period of connection via the circuit-switched network can be shortened.

Accordingly, the user is not required to constantly monitor the cellular phone in order to check whether the control right of the camera has been acquired, and is allowed to obtain a moving image as required after the control right of the camera has been acquired. In this embodiment, a user of callback must be identified, so that a mechanism of authentication is provided.

Figure 8:
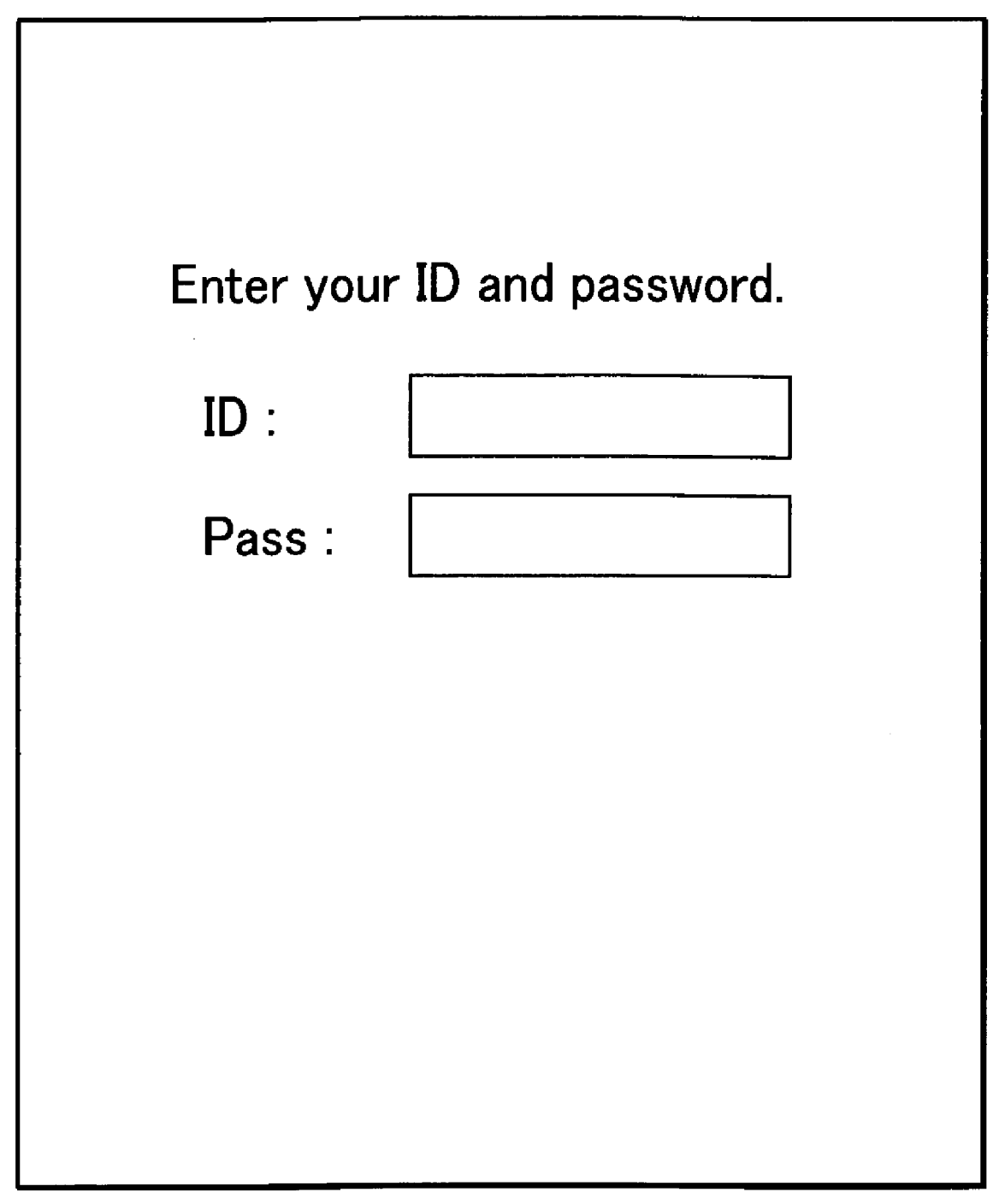

FIG. 8 shows a GUI for authentication, displayed on the display 200-001 of the cellular phone 100-011. An ID and a password of a user are input via the GUI for authentication, and then transmitted to the automatic camera-control process of the management server 100-003. Although authentication is based on ID and password in this embodiment, other authentication methods that provide similar functions may be used.

Figure 11:
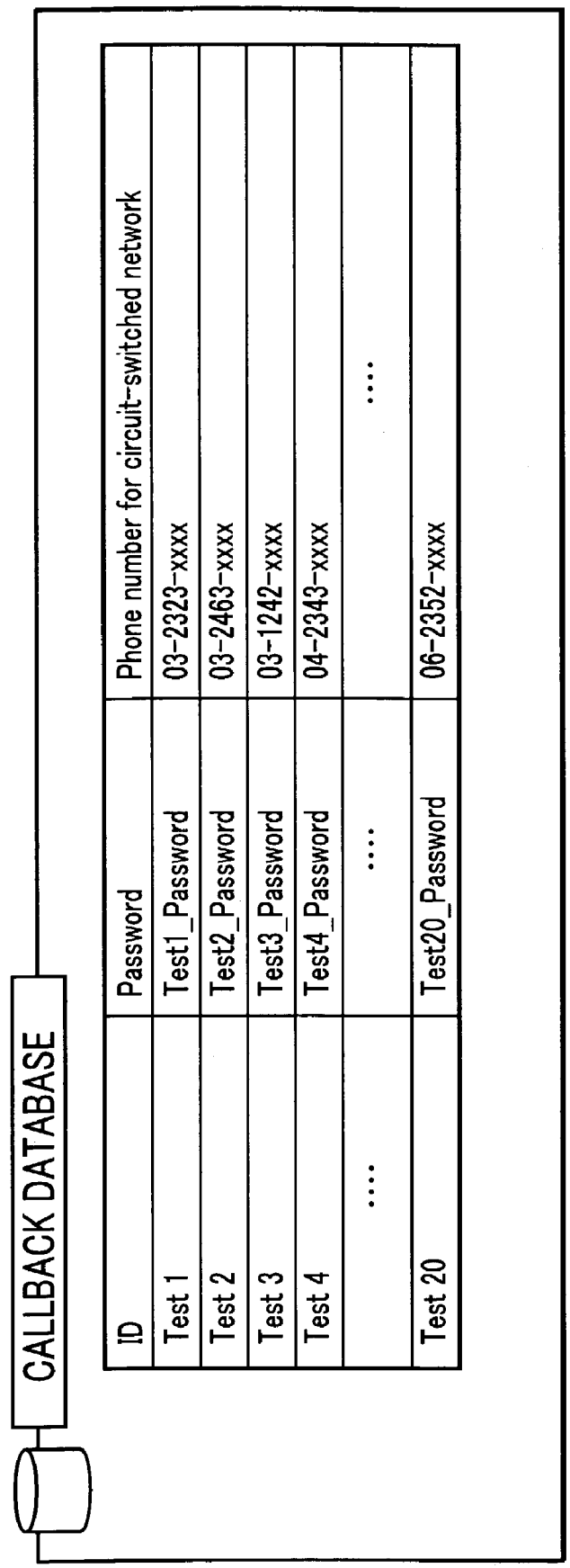
FIG. 11 is a diagram showing an example of a database for callback.

FIG. 11 shows an example of a database for callback, used in the automatic camera-control process of the management server 100-003. The database shown in FIG. 11 stores sets of ID, password, and phone number for circuit-switched connection, and a callback destination is determined based on that information. The automatic camera-control process uses the database to determine a phone number of a callback destination of a circuit-switched connection, associated with an ID and a password transmitted from a cellular phone.

Figure 10:
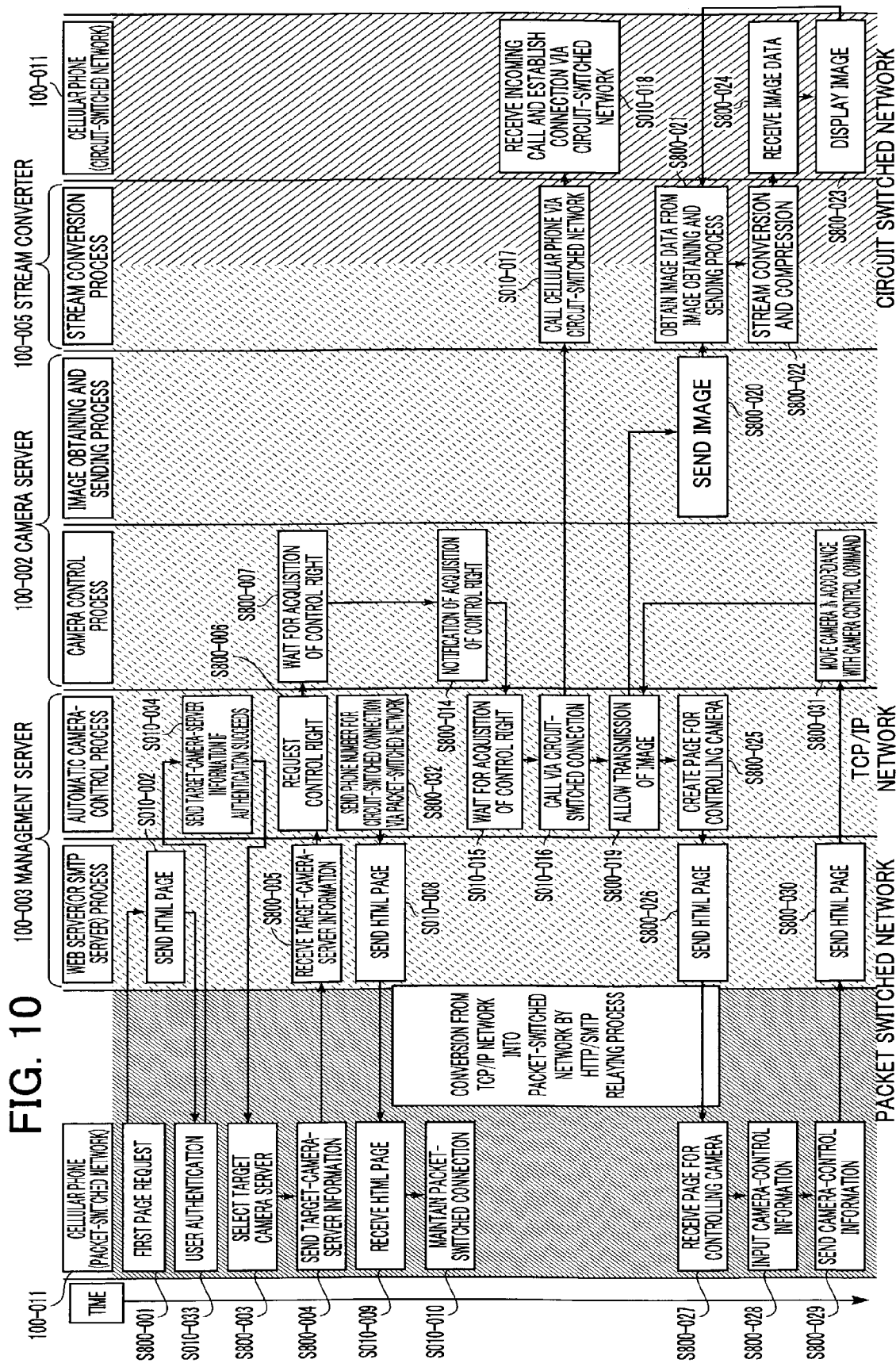
FIG. 10 is a sequence diagram of an image distribution system according to a fourth embodiment of the present invention.

FIG. 10 is a sequence diagram of the camera control system according to this embodiment. Processes designated by the same numerals as in FIG. 8 are the same processes described in relation to the second embodiment, and thus descriptions thereof will be omitted. The sequence shown in FIG. 10, as compared with the sequence shown in FIG. 8, additionally includes a process for user authentication, and a connection between the cellular phone 100-011 and the stream converter 100-005 via the circuit-switched network 100-009 is formed by the stream converter 100-005 calling the cellular phone 100-011.

First, user authentication will be described.

When a request for HTML data is received from the cellular phone 100-011, in step S010-002, the Web server process of the management server 100-003 sends HTML data for displaying the user authentication input screen shown in FIG. 8. In step S010-033, a user ID and a password are entered at the cellular phone 100-011, and the ID and the password are transmitted to the management server 100-003.

Then, in step S010-033, the automatic camera-control process of the management server 100-003 checks validity of the user ID and the password using the database shown in FIG. 11. The sequence proceeds to step S800-003 if the authentication succeeds, while the sequence is exited if the authentication fails. In this manner, user authentication is executed.

Next, a process of forming a connection by the stream converter 100-005 calling the cellular phone 100-011 will be described.

In step S010-015, the automatic camera-control process of the management server 100-003 waits until the control right of the camera is acquired. When notified by the camera server 100-003 of acquisition of the control right of the camera, in step S010-016, the automatic camera-control process issues a request for forming a circuit-switched connection to the stream converter 100-005. Then, based on information stored in the database shown in FIG. 11, the stream converter 100-005 obtains information regarding a phone number for a circuit-switched call, associated with a user authenticated. Based on the phone number information, the stream converter 100-005 calls (calls back) the phone number of the user authenticated. Then, in step S010-018, the cellular phone 100-011 forms a connection and subsequently receives a moving image.

In this manner, a moving image can be transferred via a circuit-switched connection to a user that has been authenticated.

Furthermore, by using user authentication in combination, the user is not required to wait for acquisition of the control right, and is allowed to control the camera immediately after receiving a call.

In the embodiments described hereinabove, the Web server process, the automatic camera-control process, the HTTP/SMTP relaying process, the camera control process, the image obtaining and sending process, and the stream conversion process may run on the same apparatus if these processes are allowed to call and respond to each other by internal communications within the computer. (That is, the camera server 100-002, the management server 100-003, the HTTP/SMTP relay 100-006, and the stream converter 100-005 may all be implemented by the same apparatus.) Since these processes are all logical groups, these processes may physically operate either on different apparatuses or on a single apparatus. Communications among these processes may be based on a network protocol such as TCP/IP, or may be achieved using a shared memory or shared data area using functions of an OS or the like.

Each of the camera server 100-002, the management server 100-003, the HTTP/SMTP relay 100-006, and the stream converter 100-005 is implemented, for example, by a personal computer including a ROM for storing a program for executing the relevant process, a RAM for loading the program therein from the ROM, and a CPU for executing the program.

The cellular phone 100-011, which serves as an image reception apparatus, is not limited to specific type of apparatus, and any type of apparatus having a display for showing an image and an input device for allowing a user to input instructions may be used. Furthermore, a communication terminal that allows a packet-switched network and a circuit-switched network to be selectively used or simultaneously used may be used as an alternative to the cellular phone 100-011.

Furthermore, the present invention may be implemented, for example, by supplying program code of software for achieving the functions of the embodiments to the servers and apparatuses via a network such as the Internet, and reading and executing the program code stored in storage media by computers (CPUs or MPUs) of the servers and apparatuses.

In that case, the program code read from the storage media achieves the functions of the servers and apparatuses, so that the storage media storing the program code constitute the present invention.

A storage medium for supplying the program code may be, for example, a floppy disk, a hard disk, an optical disk, a magneto-optical disk, a CD-ROM, a CD-R, a magnetic tape, a non-volatile memory card, or a ROM.

Furthermore, instead of achieving the functions of the embodiments described hereinabove by reading and executing the program code by a computer, the functions of the embodiments may be achieved by executing processes according to the program code entirely or partially by an OS (operating system) running on a computer, which is also within the scope of the present invention.

Furthermore, the functions of the embodiments may be achieved by writing the program code read from a storage medium to a memory of a function extension board inserted into a computer or of a function extension unit connected to a computer, and by executing processes according to the program code entirely or partially by a CPU or the like included in the function extension board or the function extension unit, which is also within the scope of the present invention.

When the present invention is implemented by a storage medium, the storage medium stores program code corresponding to the steps in the flowcharts described hereinabove, that is, the storage medium stores modules essential for the servers and the apparatuses according to the present invention.

As described hereinabove, according to the embodiments of the present invention, a system that allows a camera to be controlled while continuously receiving an image using a circuit-switched network and a packet-switched network can be implemented.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image distribution method for distributing an image acquired by a camera on a network, comprising the steps of:
   receiving control information to control the camera from an image reception apparatus via a first network whose bandwidth is not assured; and
   sending an image acquired by the controlled camera to the image reception apparatus via a second network whose bandwidth is assured,
   wherein the image acquired by the camera is sent to the image reception apparatus via the second network when the image reception apparatus forms a connection via the first network with a control server for sending control information to control the camera, and
   wherein the image reception apparatus obtains, via the first network, information for obtaining the image, and forms the connection for sending the image via the second network based on the information.

2. An image distribution method according to claim 1, wherein the image acquired by the camera is sent to the image reception apparatus via the second network when the image reception apparatus acquires a control right of the camera.

3. An image distribution method according to claim 2, wherein the image reception apparatus lets a distribution apparatus for distributing an image acquired by the camera call back the image reception apparatus via the second network when the image reception apparatus acquires the control right of the camera.

4. An image distribution method according to claim 1, wherein the connection via the first network is disconnected when sending of the image acquired by the camera is started.

5. An image distribution method according to claim 1, wherein the control server executes authentication of a user of the image reception apparatus when a connection with the image reception apparatus is formed.

6. An image distribution method according to claim 1, wherein the control information for the camera includes information relating to at least one of pan, tilt, and zoom of the camera.

7. An image distribution method according to claim 1, wherein the information for obtaining the image is obtained by the image reception apparatus via the first network, and the image reception apparatus forms the connection for sending the image to the image reception apparatus, said connection forming comprising dialing a telephone number corresponding to another apparatus, the telephone number being determined in accordance with the information.

8. An image distribution method according to claim 1, wherein the first network is a packet-switched network and the second network is a circuit-switched network.

9. A computer-readable storage medium storing a program that causes a computer to execute a process of distributing an image acquired by a camera on a network, the program comprising steps of:
- receiving control information to control the camera from an image reception apparatus via a first network whose bandwidth is not assured; and
- sending an image acquired by the controlled camera to the image reception apparatus via a second network whose bandwidth is assured,
- wherein the image acquired by the camera is sent to the image reception apparatus via the second network when the image reception apparatus forms via the first network with a control server for sending control information to control the camera, and
- wherein the image reception apparatus obtains, via the first network, information for obtaining the image, and forms the connection for sending the image via the second network based on the information.

10. A control server for controlling a camera, comprising:
- a receiving device for receiving control information for the camera from an image reception apparatus via a first network whose bandwidth is not assured; and
- a sending device for sending an image acquired by the camera via a second network whose bandwidth is assured,
- wherein the image acquired by the camera is sent to the image reception apparatus via the second network when the image reception apparatus forms a connection via the first network with the control server for sending control information to control the camera, and
- wherein the image reception apparatus obtains, via the first network, information for obtaining the image, and forms the connections for sending the image via the second network based on the information.

11. A control server according to claim 10, wherein the information for obtaining the image is obtained from said control server by the image reception apparatus via the first network, and the image reception apparatus forms the connection for sending the image to the image reception apparatus, the connection forming comprising dialing a telephone number corresponding to said control server, the telephone number being determined in accordance with the information.

12. An image reception apparatus for receiving an image sensed by a camera, comprising:
- a sending device for sending control information for the camera via a first network whose bandwidth is not assured; and
- a receiving device for receiving the image acquired by the camera via a second network whose bandwidth is assured,
- wherein the image acquired by the camera is sent to the image reception apparatus via the second network when the image reception apparatus forms a connection via the first network with a control server for sending control information to control the camera, and
- wherein the image reception apparatus obtains, via the first network, information for obtaining the image, and forms the connection for sending the image via the second network based on the information.

* * * * *

UNITED STATES PATENT AND TRADEMARK OFFICE
CERTIFICATE OF CORRECTION

PATENT NO. : 7,239,343 B2 Page 1 of 1
APPLICATION NO. : 10/383651
DATED : July 3, 2007
INVENTOR(S) : Hiroyuki Ohsawa et al.

It is certified that error appears in the above-identified patent and that said Letters Patent is hereby corrected as shown below:

COLUMN 3:
Line 48, "etc." should read --etc.,--.

COLUMN 10:
Line 26, "of that" should read --that--.

COLUMN 13:
Line 22, "to" should read --to a--.

COLUMN 15:
Line 13, "forms" should read --forms a connection--.

COLUMN 16:
Line 1, "connections" should read --connection--.

Signed and Sealed this

Eleventh Day of March, 2008

JON W. DUDAS
*Director of the United States Patent and Trademark Office*